United States Patent Office 3,454,541
Patented July 8, 1969

3,454,541
FILM-FORMING HYDROHALOGENATED
COPOLYMER OF DIENES
Robert J. Orr, Sarnia, Ontario, and John Evan Hazel,
Rosemere, Quebec, Canada, assignors to Polymer Corporation, Limited, Sarnia, Ontario, Canada, a body corporate of Canada
No Drawing. Filed Oct. 27, 1966, Ser. No. 589,839
Claims priority, application Canada, Nov. 16, 1965,
945,406
Int. Cl. C08f 47/00, 29/14, 27/03
U.S. Cl. 260—82.1                           6 Claims

ABSTRACT OF THE DISCLOSURE

A copolymer of a 2-alkyl butadiene e.g. isoprene and butadiene is hydrohalogenated under conditions such that the units of the 2-alkyl butadiene are hydrohalogenated and the units of butadiene are not hydrohalogenated. The units of 2-alkyl butadiene are in a major proportion. The hydrohalogenated copolymer is a thermoplastic material suitable for the preparation of internally plasticized films for packaging.

---

The present invention is concerned with improvements in or relating to processes for the production of film-forming materials by the hydrohalogenation of polymers, and to the materials produced by such processes.

Materials produced by hydrohalogenation, particularly the hydrochlorination, of natural rubber and synthetic rubbery polymers such as cis-1,4 polyisoprene have wide commercial use, for example, in the manufacture of thin transparent films for packaging. Such hydrochlorinated materials are highly crystalline in nature and must be blended with suitable plasticizing material to reduce their crystallinity and permit the production of films that are sufficiently flexible. One of the commonest effects of ageing on the resultant films is loss of plasticizer, so that they become progressively more crystalline and brittle until they cannot be handled without cracking or breaking.

It is an object of the present invention to provide new processes for the production of film forming materials which are "internally plasticized," so that films of sufficient flexibility can be produced therefrom with the use of smaller quantities of plasticizing material than hitherto, or even with no plasticizing material at all.

It is another object to provide new film-forming materials which are "internally plasticized," the structure thereof being inherently sufficiently amorphous to permit the production of flexible films therefrom with use of smaller quantities of plasticizing material than hitherto, or even without the use of any plasticizing material at all.

In accordance with the present invention there is provided a new process of producing a film-forming material which comprises the steps of copolymerizing at least two diene monomers to prepare an elastomeric copolymer, the said at least two monomers comprising a major proportion of a first diene monomer and a minor proportion of a second diene monomer, the first monomer being capable of produring a film-forming homopolymer upon hydrohalogenation and being more readily hydrohalogenated than the second monomer, and hydrohalogenating the copolymer under conditions such that the monomer units of the first diene are substantially hydrohalogenated and the monomer units of the second diene are substantially unhydrohalogenated.

Also according to the present invention there is provided a new internally plasticized film-forming material comprising a copolymer of at least two diene monomers, a first diene monomer and a second diene monomer, the monomeric units of the first diene being in a major proportion and being substantially hydrohalogenated and the monomeric units of the second diene being in a minor proportion and being substantially unhydrohalogenated.

The first diene monomer used in the copolymerization step is a conjugated alkadiene having an alkyl substituent at one of the unsaturated carbon atoms and containing from 5 to about 18 carbon atoms. The preferred alkadiene is 2-alkyl butadiene-1,3 having 1 to about 5 carbon atoms in the alkyl group and best results are obtained with isoprene. A resultant copolymer of isoprene has at least about 75 percent, preferably about 90 percent, of the isoprene units in the cis-1,4 configuration. A preferred second monomer is butadiene-1,3 and preferably the resultant copolymer has the butadiene units predominantly in the 1,4 structure.

A preferred copolymer of isoprene and butadiene comprises from about 80 to 99 percent by weight of isoprene and about 20 to 1 percent of butadiene, more preferably about 85-95 percent isoprene and about 15 to 5 percent of butadiene.

The preferred hydrohalogen is hydrogen chloride so that the copolymer is hydrochlorinated, preferably by the application to a solution of the copolymer of gaseous hydrogen chloride at pressures between about 1 and 3 atmospheres, at temperatures between about 25° C. and —80° C., the reaction being continued until substantially all monomer units of the first diene monomer are hydrochlorinated to give a chlorine content of about 24 to 32 percent by weight, preferably 26 to 30 percent by weight.

Isoprene and butadiene are preferred as respectively the first diene and the second diene, in view of their ready commercial availability and the excellent films that can be formed from hydrochlorinated polyisoprene, but processes in accordance with the invention are also applicable to other systems in which at least two conjugated diene monomers will provide an elastomeric copolymer, wherein the monomer units of one diene present in a major proportion can be hydrohalogenated to impart satisfactory film-forming properties to the copolymer, and there is a sufficient difference in reactivity of the monomers under commercially feasible hydrohalogenation conditions for the remaining other diene present in a minor proportion not to be hydrohalogenated by the conditions that cause satisfactory hydrohalogenation of the diene present in major proportion, the unreacted monomor units of the other diene being of sufficient rubbery or amorphous character to impart the desired internal plasticization to the material. Monomers suitable for use in place of butadiene are, for example, pentadiene-1,3-hexadiene-1,3, hexadiene-2,4 or mixtures of butadiene with styrene, ethylene, propylene, or isobutylene. Instead of isoprene other dienes can be used as the first monomer, for example, 2-ethylbutadiene-1,3, 2-isopropyl butadiene-1,3, 2-amyl butadiene-1,3, 2-methyl pentadiene-1,3, or mixtures thereof.

In determining the conditions under which the copolymerization is to be effected a number of factors must be considered. For example, a commercially desirable film intended for wrapping purposes is not only flexible and extensible, but preferably is completely transparent, and to obtain a correspondingly suitable film-forming material it is desirable to carry out copolymerization under conditions such that there is a minimum of formation of gel that is insoluble in the solvent used in the film-forming step, and that a copolymer is formed which does not gel in the subsequent hydrohalogenation, such a gel usually resulting in a haze or opalescence in the film and also causing a degradation of the desired physical properties. When the first diene monomer is isoprene, the conditions must be such that the resulting copolymer has at least about 75 percent, preferably about 90 percent, of the isoprene units in the cis-1,4 configuration, since the hydrochlorination product of trans-1,4 polyisoprene will not form films of desired strength. When the second monomer is butadiene, it is also preferred to employ conditions that will result in the copolymer having butadiene units in the 1,4 structure, preferably in the predominantly cis-1,4 configuration, so that it will have the maximum plasticizing effect. In the case of copolymers of dienes other than isoprene and butadiene, the conditions of the copolymerization are such that the monomeric units of the first diene polymerize in an essentially head-to-tail manner to produce in the main polymer chain one double bond per monomer unit and a stereo-regular configuration such that favours crystallization of the copolymer upon hydrohalogenation. The configuration of the second diene in the copolymer is not as critical as that of the first diene and it may be stereo-irregular provided that monomeric units of the second units are sufficiently flexible and do not gel either in the copolymerization or subsequent hydrohalogenation. The molecular weight of the resulting copolymer must be sufficiently high to have film-forming characteristics, and yet reaction times must be sufficiently short to be economically attractive.

Catalyst systems suitable for application to polymerization mixtures of the present invention comprise organometallic catalysts, the polymerization being effected in an inert hydrocarbon solvent. A specific catalyst system which is particularly suitable for the preparation of a copolymer of isoprene and butadiene, in which the isoprene units are predominantly in the cis-1,4 configuration, is one employing lithium metal and a lithium alkyl compound in a hydrocarbon solvent system that is free of polar compounds, such a system resulting in a copolymer in which the butadiene monomer units polymerize in the 1,4 structure but of mixed trans- and cis-structural configuration. Another specific system employs a mixture of aluminum trialkyl $AlR_3$, which may for example be aluminum triethyl or aluminum triisobutyl, and titanium tetrachloride in a molar ratio of about 1.2:1, such a system resulting is a copolymer in which the isoprene units also are in the cis-1,4 structural configuration and the butadiene units are about 95% in the 1,4 structure and predominantly in the cis-1,4 configuration.

A particular preferred catalyst system capable of producing a gel-free, high molecular weight, high cis-isoprene/butadiene copolymer is that employing an alkyl lithium initiator having about 2 to 12 carbon atoms, such as butyl lithium, dodecyl lithium, or dilithium pentane. The concentration to initiate polymerization and obtain a product of sufficiently high molecular weight depends on the impurities present in the monomers and the amount and type of the solvent and varies within the limits of about 0.1 to 10, and preferably about 1–2 millimoles of initiator per litre. The effect of increasing initiator concentration is to increase the rate of polymerization, but also to reduce the molecular weight, so that it is preferred to adjust the rate by selecting a temperature between 0 and 100° C., the preferred temperature being about 25° C. to 70° C. The copolymerization reaction is most conveniently carried out while the monomers and catalyst are dispersed in a non-reactive organic liquid medium. The most useful liquids are aliphatic, alicyclic and aromatic hydrocarbons such as pentane, hexane, heptane, isooctane, cyclohexane, benzene, toluene or xylene. Halogenated hydrocarbons such as methylene dichloride, ethylene chloride and carbon tetrachloride may also be used either alone or in mixtures with hydrocarbons. It is preferred to use a liquid medium that is inert to both, the catalyst and the hydrohalogen, and a good solvent for the copolymer as well as the hydrohalogenated copolymer so that one and the same medium is used in both steps, the copolymerization and the hydrohalogenation. Infrared analysis shows that typical isoprene-butadiene copolymers in accordance with the invention have, when produced using this preferred catalyst system, an isoprene microstructure of less than about 10 percent 3,4-structure and more than about 90 percent 1,4-structure, about 85–100 percent of the 1,4-portion being of cis-1,4 configuration.

The preferred hydrohalogen is hydrogen chloride and may be reacted with the copolymer by supplying the dry gaseous hydrogen chloride under pressure to a solution of the copolymer in a suitable solvent, such as dry toluene or benzene, these solvents being preferred since the reaction progresses therein at satisfactory speeds, and physical characteristics make them readily removable during subsequent film-forming operations. Hydrogen bromide can also be used as the hydrohalogenation agent. The addition of the hydrohalide may be effected at a temperature of from −80° C. to +25° C., preferably between 0° C. and −80° C., the gas preferably being supplied to the reaction vessel at pressures of about 1–3 atmospheres. Under these conditions the hydrohalide will add readily to the methyl substituted carbon atom of isoprene units that are in the 1,4 configuration, while neither the butadiene units nor the small portion of the isoprene units in the 3,4 configuration will be substantially reacted. The reaction can therefore be permitted to go to completion, and generally will be found to come to a halt, when the product contains about 24 to 32 percent by weight of halogen. With copolymers in accordance with this invention it is found that hydrochlorination proceeds to about 75–95 percent of the theoretical maximum of the isoprene units available for such reaction and then stops. It is found with hydrochloride contents lower than the preferred value the resultant films tend to be sticky and weaker than is usually required, while if higher contents are attempted the conditions may be so severe that at least an appreciable portion of the butadiene monomer units are reacted, so that the plasticizing effect of the butadiene units is lost. The time of reaction was found not to be critical in view of its self-stopping characteristic, and at temperatures of about 0° C. any time between about ½ and 6 hours was found to be satisfactory, with no apparent effect on the chlorine content or the properties of the resultant films.

Following the hydrochlorination process the solution is allowed to warm to ambient temperature and steps are taken to remove all dissolved hydrochloric acid, e.g. by the application of suction, followed by bubbling nitrogen through the solution until no ammonium chloride could be detected, when the nitrogen effluent was brought into contact with ammonia. The solution may also be freed from the dissolved hydrohalide by washing with an aqueous alkali. The solution can then be used for the production of thin films by use of any of the conventional techniques and apparatus.

The internal plasticization produced by the selective hydrohalogenation in accordance with the invention is believed to be due to the presence of the unhydrohalogenated diene units distributed throughout the highly ordered and readily crystallizable hydrohalogenated units of the first diene, the effect of the unhydrogenated units being to reduce the overall tendency to crystallize the resultant film-forming material. It has been found with an isoprene/butadiene film-forming copolymer in accordance with the invention that as little as 1 percent of butadiene content is sufficient to effect an appreciable reduction in crystallinity, and the preferred content of the unhalogenated diene is 1 to 20 percent by weight, more preferably from 5 to 15 percent by weight. X-ray methods can be used to measure the crystallinity of the resulting film-forming materials, and it is found in hydrochlorinated isoprene-butadiene copolymers that materials having five percent or more of butadiene content have a completely amorphous structure in their relaxed state, and are crystalline when stretched to more than about 100 percent elongation, e.g. 400 percent elongation. For many purposes they may be regarded as completely internally plasticized, so that no additional plasticizer will be required in the production of satisfactory strong, flexible transparent films.

The transparent films produced from materials in accordance with the invention, particularly those of isoprene-butadiene copolymers with a butadiene content within the specified range, are found to have a distinctly less crinkly, more plastic feel (more pleasing "hand") than similar films of hydrochlorinated cis-polyisoprene.

The hydrochlorinated copolymers of isoprene and butadiene of this invention show improved tensile strength, elongation, tear strength and a lower Young's modulus than hydrochlorinated homopolymers of isoprene produced under similar conditions.

It is contemplated that film-forming materials having an unhydrohalogenated diene content lower than that required to give complete internal plasticization are within the scope of the present invention, in that a substantial reduction will be permitted in the amounts of plasticizer required for the production of satisfactory films.

EXAMPLE 1

A series of isoprene-butadiene copolymers was produced by polymerizing a mixture of 95±8 milliliters of both monomers in 300 milliliters of benzene using about 1.0 to 1.25 millimoles of n-butyl lithium as the initiator. The copolymerization reactions were carried to completon at 50° C. in an atmosphere of dry nitrogen using thoroughly dried 1 liter crown-capped bottles. The copolymers were recovered by precipitation with ethanol containing about 1% of ditertiary butyl p-cresol and then dried in vacuo at 40° C. for 16 hours. The solubility and intrinsic viscosity of the copolymers were determined at 30° C. in toluene and are presented in Table I along with the polymer compositions assumed to be identical to monomer compositions as introduced into the bottles. A homopolymer of isoprene prepared using the same polymerization system was used as the control polymer.

TABLE I

| Sample | Butadiene content (percent by wt. of polymer) | Intrinsic viscosity (dl./g. in toluene at 30° C.) | Solubility (percent) |
|---|---|---|---|
| A (Control) | 0 | 3.4 | 99.4 |
| B | 5.3 | 3.1 | 100 |
| C | 10.6 | 4.3 | 99.6 |
| D | 19.8 | 5.1 | 100 |

The copolymer C was analyzed by means of an infrared spectrophotometer. The spectrum showed that the isoprene monomer units were about 92% in the cis-1,4 configuration and 8% in the 3,4 structure. The presence of about 10% of the butadiene units, mostly in the 1,4 structure, was also detected.

Polymers A, B and C were next dissolved in 400 mls. of dry toluene to make a 2.5% weight by volume solution. These solutions contained in 1 liter bottles were cooled to −5° C. and subjected to the action of gaseous hydrogen chloride for periods of 5 hours, introduced at a pressure of 1.4 atmosphere by means of a long needle that extended beneath the surface of the solution. At the end of the reaction period the bottles were vented and allowed to warm to room temperature. Suction was applied to draw out the dissolved gas, and thereafter the solutions were purged by bubbling nitrogen gas through them until no ammonium chloride could be detected when the effluent gases were contacted with ammonia; this purging normally took about 20–30 minutes. Films were then produced by spreading the solution on clear glass plates, allowing the solvent to evaporate slowly, and drying the films by radiant heat. The dried films peeled easily off the glass plates and were very clear with no sign of gel. If evaporated sufficiently slowly they were also smooth and even. Six micro dumbbell specimens were died out from each of the films A, B and C and tested for stress-strain properties using an Instron tester. The results were averaged and are presented in Table II. Chlorine content was determined gravimetrically by digesting hydrochlorinated polymers with a hot oxidizing acid and absorbing the evolving chlorine-containing gases in a silver nitrate solution.

TABLE II

| Sample | A (Control) | B | C |
|---|---|---|---|
| Butadiene content (percent by weight of copolymer) | 0 | 5.3 | 10.6 |
| Chlorine content (percent by weight) | 29.7 | 29.1 | 27.7 |
| Tensile strength (kg./cm.$^2$) | 226 | 286 | 246 |
| 300% modulus (kg./cm.$^2$) | 175 | 142 | 157 |
| Elongation (percent) | 380 | 460 | 445 |
| Tear strength (kg./cm.) | 13.2 | 16.7 | 26.0 |

The above results indicate that the tensile strength, elongation and tear strength of hydrochlorinated copolymer film are higher than those of the hydrochlorinated homopolymer of isoprene. Modulus of hydrochlorinated copolymer films is lower than that of the homopolymer.

The hydrochlorinated films were clear and transparent before stretching, and after stretching to about 400% elongation showed milkiness which is typical of crystallizable polymers. When examined under X-rays the hydrochlorinated copolymers B and C, stretched to 400% elongation, showed a high crystallinity. The infrared analysis of hydrochlorinated sample C showed that the unsaturation of isoprene units practically disappeared and that new peaks in the IR spectrum were detected due to the presence of $CH_2$—$CH_2$—$CH_2$ segments formed in the chain upon hydrochlorination of isoprene units. The peaks due to the unsaturation of butadiene units were substantially as before hydrochlorination indicating that butadiene units were not hydrochlorinated.

EXAMPLE 2

The samples A, B, C and D of Table I were hydrochlorinated according to the procedure described in Example I and then tested for puncture strength. In this test a disc of the film of diameter 23 mm. was placed on a flat surface with a centrally located hole of 3 mm. diameter and clamped so that the central portion over the hole was unclamped and exposed. Using an Instron tester a penetrating device of diameter 1.7 mm. having a semispherical tip was brought to bear on the film at the centre of the exposed portion and pressure applied until the film ruptured. The Instron tester recorded a stress-strain graph from which the following magnitudes were determined: the extension, that is, the distance in millimeters the film bulged before rupture, the ultimate force required to penetrate the film, that is, puncture strength, and the initial slope of the stress-strain curve which is a measure of Young's modulus. At least two films of each composition were tested in the above manner, the results were averaged and are presented in Table III.

TABLE III

| Sample | A (Control) | B | C | D |
|---|---|---|---|---|
| Butadiene content (percent by wt. of copolymer) | 0 | 5.3 | 10.6 | 19.9 |
| Chlorine content (percent by wt.) | 29.7 | 29.1 | 27.7 | 25.7 |
| Film thickness (mm.) | 0.034 | 0.043 | 0.032 | 0.068 |
| Extension (mm.) | 5.8 | 7.2 | 9.5 | 8.9 |
| Puncture strength (kg./cm.) | 164 | 134 | 170 | 72 |
| Initial slope (kg./c.m.$^3$) | 0.112 | 0.072 | 0.044 | 0.053 |

Table III indicates that the hydrochlorinated copolymer films are more extensible, have a lower modulus as indicated by the initial slope of the stress-strain curve than the control. The puncture strength appears to depend on film thickness and is significantly higher for the thinner film of Sample C than for the 0.068 mm. thick film of Sample D.

EXAMPLE 3

The effect of butadiene content on stress-strain properties of hydrochlorinated copolymer of isoprene an butadiene is shown in Table IV. The samples were prepared as described in Example I. The hydrochlorination reaction was carried out at −5° C. for about 6 hours on 2.5% weight by volume solutions of the copolymers in toluene. The results are presented in Table IV.

TABLE IV

| Sample | Bd. content (percent by wt.) | Cl. content (percent by wt.) | Tensile (kg./cm.²) | 300% modulus (kg./cm.²) | Elongation (percent) |
|---|---|---|---|---|---|
| Control | 0 | 31.4 | 248 | 79.1 | 555 |
| 1 | 2.0 | 28.8 | 269 | 69.3 | 525 |
| 2 | 5.2 | 27.9 | 322 | 75.9 | 555 |
| 3 | 9.9 | 27.9 | 348 | 107.3 | 460 |
| 4 | 15.3 | 27.7 | 237 | 57.7 | 490 |
| 5 | 19.9 | 26.9 | 205 | 66.8 | 520 |
| 6 | 30.0 | 22.8 | (*) | (*) | (*) |
| 7 | 40 | 20.0 | (*) | (*) | (*) |

*Did not form films.

The above data show that optimum stress-strain properties are at a butadiene content of about 5 to 10% by weight.

EXAMPLE 4

A series of hydrochlorination experiments was carried out under different conditions as shown in the table below. The copolymers used in these experiments were prepared as described in Example I. Their composition was assumed to be equal to the composition of the monomer mixture used in the polymerization step. The copolymers dissolved in solvents as indicated in the table below were hydrochlorinated at −5° C. under the pressure of 1.4 atmospheres of dry HCl. Time of hydrochlorination and concentration of copolymer solutions are indicated in Table V.

TABLE V

| Sample No. | Butadiene content | Solution concn. (percent wt./vol.) | Time of hydrochlorination (hours) | Chlorine content (percent wt.) | Tensile strength (kg./cm.²) | 300% modulus (kg./cm.²) | Elongation (percent) |
|---|---|---|---|---|---|---|---|
| 1 | 9.9 | 7.0 | 5 | 25.0 | 51 | 50 | 310 |
| 2 | 9.9 | 5.0 | 6 | ¹ 27.7 | ¹ 306 | ¹ 146 | ¹ 425 |
| 3 | 9.9 | 2.5 | 6.5 | ² 27.4 | ² 196 | ² 49 | ² 470 |
| 4 | 19.9 | 2.5 | 2 | ² 26.6 | ² 215 | ² 77 | ² 490 |
| 5 | 19.9 | 2.5 | 4 | ² 26.5 | ² 226 | ² 84 | ² 490 |
| 6 | 19.9 | 2.5 | 6 | 26.9 | 205 | 67 | 520 |
| 7 | 5.2 | 2.5 | 1 | 28.0 | 226 | 30 | 615 |
| 8 | 5.2 | 2.5 | 2 | 28.3 | 291 | 61 | 575 |
| 9 | 5.2 | 2.5 | 6.5 | ² 27.8 | ² 272 | ² 58 | ² 560 |
| 10 | 5.2 | ³ 2.5 | 5 | ² 29.3 | ² 218 | ² 175 | ² 400 |
| 11 | 5.2 | ⁴ 2.5 | 5 | ² 12.8 | (⁵) | (⁵) | (⁵) |

¹ Average of three measurements.
² Average of two measurements.
³ Solution in benzene, hydrochlorination at about 10° C.
⁴ Solution in carbon tetrachloride. Samples 1 to 9 were hydrochlorinated in toluene solution.
⁵ Not film forming.

Table V shows that best results are obtained with solutions in toluene at concentrations below 7%. It also shows that the optimum time of hydrochlorination at −5° C. is about 2 hours. Sample 10 shows that the copolymers are more readily hydrochlorinated at 10° C. in benzene than in toluene. The hydrochlorination of the copolymer dissolved in carbon tetrachloride is slower than in aromatic solvent and appears to require harsher conditions for the preparation of film-forming hydrochloride.

An additional experiment was carried out at −75° C. with the copolymer solution of Sample 4. It was found that the hydrochlorination reaction under 1.4 atm. pressure of dry HCl had to be continued for 5 hours and preferably 6 hours in order to raise the chlorine content to 25.0% by weight of the copolymer and to produce a film-forming hydrochloride of satisfactory tensile strength of at least 100 kg./cm².

What is claimed is:

1. An internally plasticized film-forming material comprising a copolymer containing units of a 2-alkyl butadiene-1,3 having 1 to 5 carbon atoms in the alkyl group and butadiene-1,3, the units of said 2-alkyl butadiene-1,3 being in a major proportion, being copolymerized in an essentially heat-to-tail manner to a steroregular configuration and being substantially hydrohalogenated and the units of butadiene-1,3 being in a minor proportion and being substantially unhydrohalogenated.

2. The material of claim 1 wherein the 2-alkyl butadiene-1,3 is isoprene.

3. The material of claim 2 wherein at least 90 percent of isoprene units have the cis-1,4 configuration.

4. The material of claim 2 wherein the copolymer comprises 80 to 99 percent by weight copolymerized isoprene and 20 to 1 percent by weight copolymerized butadiene.

5. The material of claim 4 wherein said isoprene is substantially hydrochlorinated.

6. A method of producing the material of claim 1 which comprises copolymerizing a major portion of a 2-alkyl butadiene-1,3 having 1 to 5 carbon atoms in the alyky group and a minor proportion of butadiene-1,3 to produce a copolymer having said 2-alkyl butadiene-1,3 copolymerized in an essentially head-to-tail manner in a stero-regular configuration and hydrohalogenating said copolymer by feeding dry hydrogen chloride into an inert solvent containing less than 7 percent by weight of said copolymer at a temperature between −80° C. and +25° C. under a pressure of from 1 to 3 atmospheres until the product contains from 24 to 32 percent by weight of chlorine.

References Cited

UNITED STATES PATENTS 2,831,839  4/1958  Canterino _____ 260—82.1
3,293,226  12/1966  de Schrijuer _____ 260—85.1

JOSEPH L. SCHOFER, Primary Examiner.

R. A. GAITHER, Assistant Examiner.

U.S. Cl. X.R.

260—85.1, 85.3, 96